March 23, 1943.  J. G. HARGRAVE ET AL  2,314,497
CAUSE-INDICATING APPARATUS FOR VEHICLES
Filed Nov. 24, 1939  2 Sheets—Sheet 1
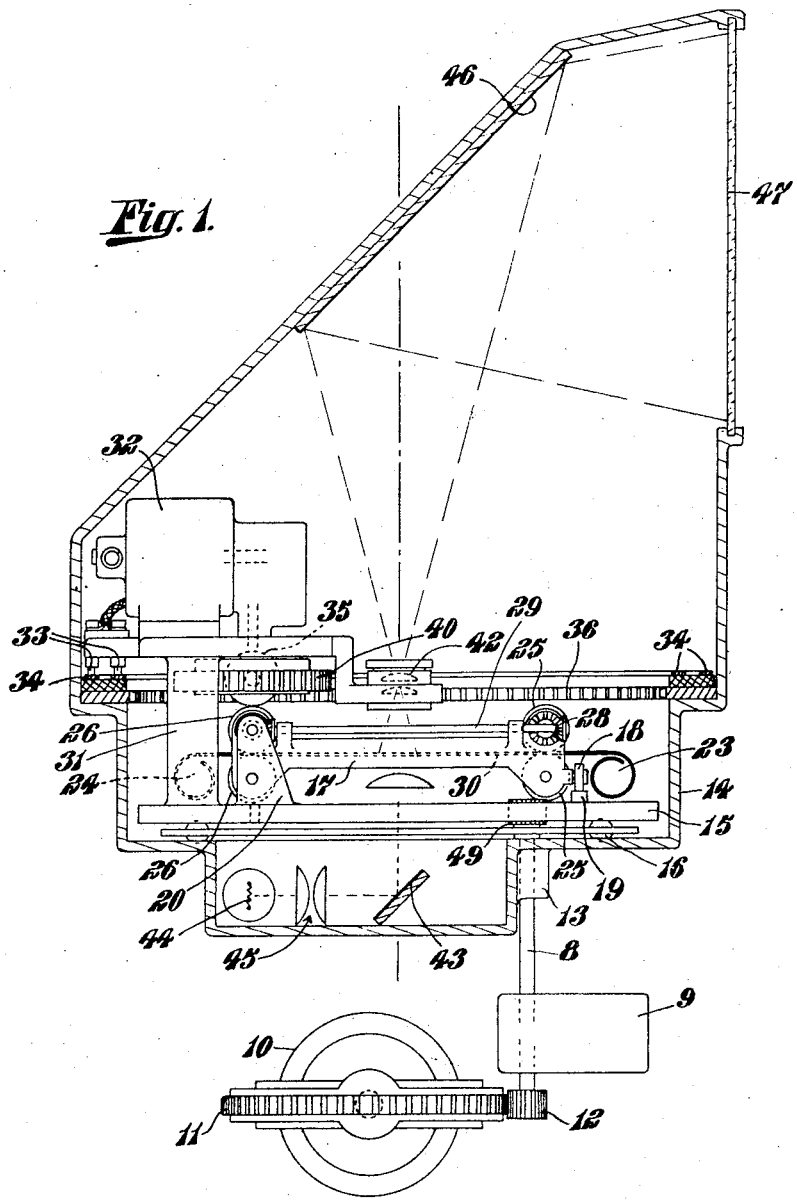

March 23, 1943. J. G. HARGRAVE ET AL 2,314,497
CAUSE-INDICATING APPARATUS FOR VEHICLES
Filed Nov. 24, 1939 2 Sheets-Sheet 2
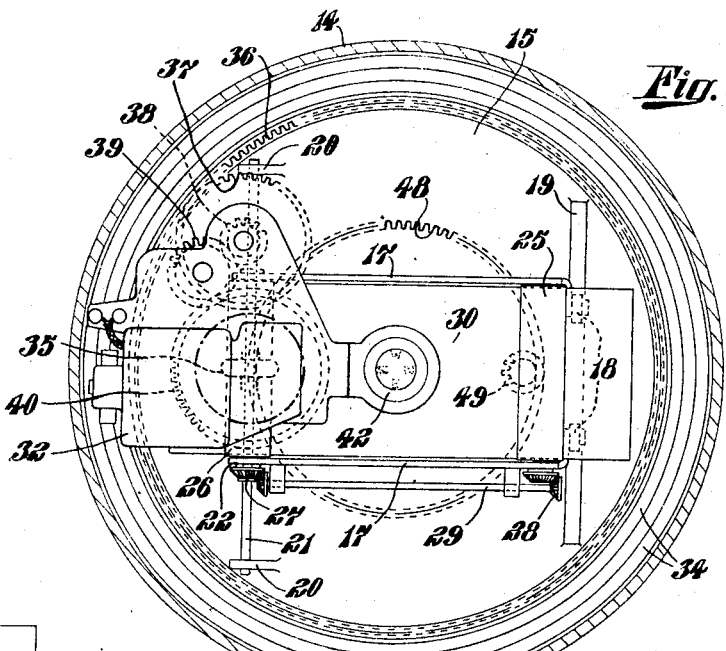
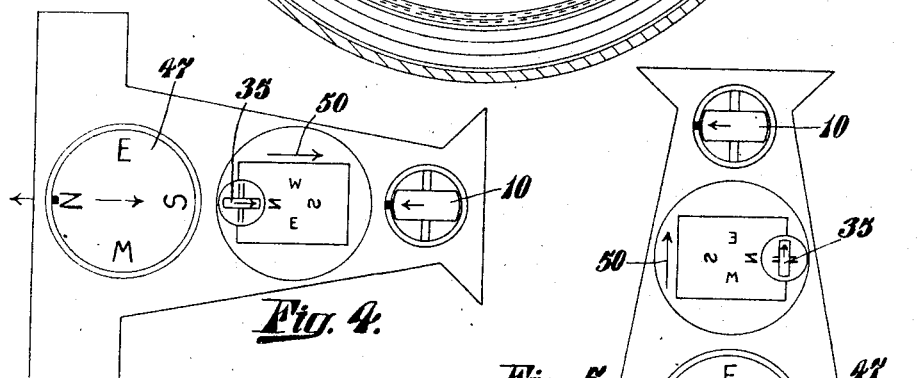
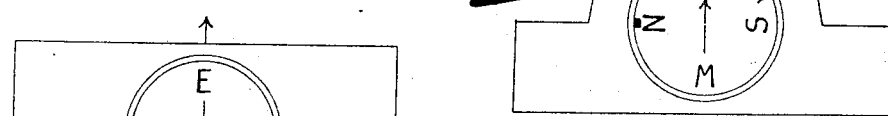
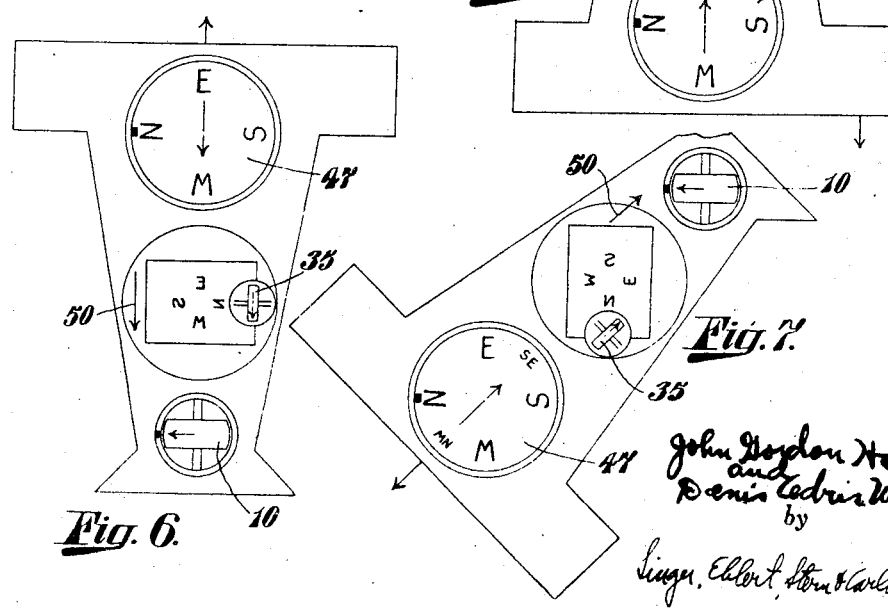

Patented Mar. 23, 1943

2,314,497

UNITED STATES PATENT OFFICE 2,314,497

COURSE-INDICATING APPARATUS FOR VEHICLES

John Gordon Hargrave, Kings Langley, and Denis Cedric Williams, London, England

Application November 24, 1939, Serial No. 366,010
In Great Britain November 29, 1938

9 Claims. (Cl. 40—42)

This invention relates to course-indicating apparatus for vehicles (land, air or waterborne) operating by light-transmission by which any portion of a design, picture, photograph, map or otherwise (included in such apparatus) mounted to be moved in its own plane in two directions mutually at right angles, can be reproduced on a screen (forming part of the apparatus) by projection or reflection, or any desired combination thereof.

Where the transmission is wholly or partly by projection the map or otherwise is on a suitable transparency, such as a lantern slide, film or the like; where, however, the transmission is wholly by reflection, the image to be reflected is on ordinary opaque or translucent material. In any event, preferably the arrangement is such that the portion reproduced on the screen is a magnified image and if desired the screen may be of translucent material, so that the image thereon can be observed through its material.

According to the principal feature of the invention the means carrying the map or the like (hereafter termed the slide) is so constructed and mounted in the apparatus that the setting or direction of the slide (in relation to the vehicle) is controllable by gyroscopic means included in or separate from the apparatus and its movement of progression (in relation to the course being moved or flown over) controlled by a suitable motor, this latter drive being regulatable to enable it to be set to variable conditions.

In preferred constructions the complete apparatus forms an encased unit, the screen coming on a suitable surface thereof readily to be seen by an observer. Further, in order to decrease the bulk the apparatus may include in the interior, prisms, mirrors, lenses and other optical accessories in desired relationship which enable a large image to be obtained in a confined space.

In a preferred method of carrying the invention into effect a projection system is included, with the slide in a horizontal plane and carried in two guideways or their equivalents mutually at right angles so that it can be moved in any direction in the said horizontal plane, under the gyroscopic and motor control. It is thus possible for any point of its surface to come in the axis of projection. On the underside of the slide there is arranged a light source such as a suitable electric lamp, and optical means such as a condenser, the axis being parallel to the plane of the slide, as well as a right-angled prism or its equivalent.

Above the slide is a suitable projection lens arranged in the projection axis and a desired distance therefrom a silver-surfaced mirror is arranged at a desired angle to the horizontal. This comes towards the top of the casing, the vertical front of which includes a translucent screen, for example a ground glass surface. The size and disposition of the parts are such that the image projected on to the viewing screen is the desired part of the slide, for example that part of a map showing the portion of the course over which the vehicle is moving.

The gyroscopic system may be any one found suitable, for example including a gyroscope having its axis horizontal with the circular frame carrying the pivots of the gyroscope wheel mounted gimbal fashion in an outer framework comprising a suitably supported horizontally arranged ring mounted in ball bearings in its support and the exterior of which is toothed.

Meshing with this horizontally arranged ring (having teeth on the exterior) is a pinion the shaft of which has its bearing means suitably carried by the casing so that with any change of direction of the vehicle it can roll around the horizontally arranged ring. This shaft itself carries gearing means or is connected to gearing means for controlling the setting of the slide in the casing and also the means for imparting the motor drive to the slide participates in the same setting.

As will be obvious, the invention may take a great variety of practical forms and further as the course to be set by the vehicle (motor car, aeroplane, ship or otherwise) in the main will be a direct course, necessitating none but necessary deviations on one side or the other from the straight, one dimension of the slide (the longitudinal) will be much greater than the other (transverse). In these circumstances although the slide representing the course can have the longitudinal dimensions to one scale and the transverse dimensions to another scale, yet it is preferable the dimensions should be to the same scale. It follows therefrom that the longitudinal direction of the slide, perforce, must be much greater than the transverse dimensions. In these circumstances, to reduce the bulk of the apparatus, the slide in the longitudinal direction can be, and in practical forms of the apparatus is, replaced by a mechanical equivalent. Such a mechanical equivalent comprises driven rollers upon which can be wound a flexible slide so that as the rollers are rotated in one direction or the other, the equivalent movement of the slide is given.

In order that the invention may be better understood, it will now be described with reference to the accompanying semi-diagrammatic drawings, which are given by way of example only and in which:

Fig. 1 shows a sectional elevation of an apparatus constructed according to the invention for mounting in an aeroplane.

Fig. 2 shows a fragmentary view of a portion of Fig. 1 in somewhat more detailed section.

Fig. 3 shows a plan of a portion of Fig. 1, and Figs. 4, 5, 6 and 7 show diagrammatic plans to illustrate the action of apparatus constructed according to the invention.

It should be here explained that although the apparatus in accordance with the invention may itself include gyroscopic means, yet the gyroscopic control can be effected from other gyroscopic means mounted for other purposes in the vehicle, for example in the aeroplane or otherwise.

Such gyroscopic means as previously employed give what may be termed a standard orientation or datum upon which the apparatus can work and may include in their structure, or have associated therewith, servo-motor means, to give the necessary mechanical energy to carry out the various movements.

In the drawings a diagrammatic representation of such gyroscopic means has been shown to operate a shaft 8.

Thus, it generally must be understood that this shaft 8 receives directly or through servo-motor means, denoted by 9, turning movements or rotations or partial rotations due to its control from a gyroscopic mass 10 which through its gimbal and other mountings maintains in a definite orientation, a toothed ring 11 which, for example, is mounted to roll on ball or other bearings (not shown) in the aircraft.

Consequently a pinion 12 carried by the shaft 8 mounted in bearing means 13 attached to a casing 14 for the apparatus, carried in a fixed position relative to the vehicle (aircraft) is caused by the varied directional steering of said aircraft to roll around the toothed ring 11 and directly, or as indicated, through the servo-motor means 9, to rotate the shaft 8 carried by the casing 14 of the apparatus (relatively fixed with regard to the aircraft).

15 is a turntable mounted upon ball bearings 16 in the casing 14. This turntable has an inner toothed annulus 48 with which meshes a pinion 49 on the upper end of the shaft 8, the arrangement being such that between the toothed ring 11 and the annulus 48 there is a 1:1 gearing. The turntable 15 carries a slide adapted to have movements in a horizontal plane in two directions mutually at right angles.

For this purpose the mechanism may be any suitable to conform to the conditions. However, in accordance with the particular conditions whereby the longitudinal direction of a set course is much greater than the transverse deviations from the course, this slide is constructed from a carriage 17 mounted at one end on rollers 18 to move on a guide 19 carried by the turntable. At the other end the turntable carries brackets 20 for a fixed rod 21, which latter is parallel to the guide 19 and has co-operating therewith sliding bearings 22 comprised by the carriage 17. Thus, to move the carriage 17 in the transverse direction the rollers 18 run on the guide 19 and the bearings 22 move over the fixed rod 21.

To allow for the much greater dimensions in the longitudinal direction, it is of course obvious that a similar guiding structure such as that described with regard to 13 and 21 could be utilised in a direction at right angles to the said guides 13 and 21. However, this would unduly increase the dimensions of the apparatus. Consequently, as an equivalent, for movement in this direction the slide, having the exemplification of a flexible film, is associated with let-off means 23 and take-up means 24, these latter being but sketchily illustrated in the drawings. For the purpose of the movement in this longitudinal direction, however, a pair of gripping rollers 25 is provided at one end and another pair 26 at the other end, these rollers being intergeared (as shown in Fig. 3) by the pairs of bevel gears 27—28 and the connecting shaft 29. Although not absolutely necessary, in some cases the rollers 25 and 26 may have associated therewith, or their spindles may have mounted thereon, toothed sprocket wheels definitely engaging sprocket perforations in the edges of the film 30 constituting the slide.

The table 15 further carries, by brackets or the like 31, driving means for the progression of the slide. These, as shown, comprise a motor 32 which may be of any type. For example, it can be a spring motor or, as shown in the drawings, an electric motor receiving its current through brushes 33 associated therewith and contact rings 34 fixed to the casing 14. Thus, in any position of the motor (according to the setting of the turntable 15 in relation to the casing 14) current is conveyed thereto.

The motor is set to drive in accordance with the speed of the vehicle and drives through reduction gearing a progress wheel 35 which meshes with the upper roller 26. The reduction gearing may be of a high order, for example 20000:1. In other words, the progress drive of the slide is but slight as compared with other movements of the apparatus.

It should be explained that the motor has a one-direction drive but that owing to the setting it is necessary the progress wheel 35 should cause the slide to move longitudinally in one direction or the other. Thus it is necessary to provide means by which this progress wheel 35, although constantly driven in one direction by the motor, may be turned about a vertical axis.

In this manner when so turned, if this turning is through 180°, the relative drive of the slide is reversed in the longitudinal direction. If, however, only turned through 90°, the longitudinal drive is entirely eliminated but a transverse drive is effected. Further, in intermediate positions the drive for the slide has both a longitudinal and a transverse component.

To carry out the above objects, the casing includes a fixed annulus 36 which meshes with a gear wheel 37 having fixed on its spindle a pinion 38 meshing with another gear wheel 39 carried by a spindle associated with the casing of the motor 32. This gear wheel 39 finally meshes with a gear 40 across which in a diametrical position is a spindle 41 carrying the progress wheel 35.

The relative sizes and arrangement of the gears 37, 38, 39 and 40 are such that the gear 40 is turned through 180° when the annulus 36 moves with the vehicle through 180°.

The turntable 15 further carries in the axis thereof and above the slide 30 a lens system 42. Below the slide and fixedly attached to the casing is a reflector (mirror or prism) 43, a source of light 44 (electric incandescent lamp) and a condenser system 45. In the optical axis beyond the lens system 42 is a reflector 46 carried by the casing 14 which projects the image to a translucent screen (ground glass) 47 suitably disposed for viewing by the pilot, or driver.

As will be realised, by the variation in the direction of flight of the vehicle (aeroplane) the pinion 12 is caused to roll around the toothed ring 11.

The arrangement is such that in whichever direction the aircraft is being flown, the image of the representation of the course being flown over moves from the upper part of the screen 47 towards the lower part thereof and further, the progress wheel 35 by its directional drive (from the relatively fixed annulus 36) is always set to move the slide in the desired direction with reference to the lens system.

Thus, in Fig. 4 the aircraft is flying due north and the progress wheel 35 is moving the slide 30 (through the upper roller 26) from north to south as represented by the arrow 50.

Referring now to Fig. 5, the aircraft is flying due west and the image is moving downwards from the top of the screen to the lower part whilst the progress wheel 35 (through its driving engagement with the upper roller 26) is moving the slide in the direction of the arrow 50 from west to east.

The same conditions apply in both Figs. 6 and 7. The first-mentioned is in the opposite direction of flight to that shown in Fig. 5 and although the image on the screen 47 still moves from the top to the bottom, in this case the movement is from east to west as exemplified by the drive of the slide through the progress wheel 35 co-operating with the upper roller 26 to move the said slide in the direction of the arrow 50.

The case of Fig. 7 is particularly interesting as here the progress wheel 35 through its driving contact with the upper roller 26 moves the slide 30, still in the direction of the arrow 50, but owing to the relative angular orientation of the slide, this movement is made up partly of movement of the rollers 18 on the guides 19 and bearings 22 over the rod 21, and partly by the winding on or off of the take-up and let-off means 24 and 23.

In all cases it should be observed from Figs. 4 to 7 that the gyroscope 10 remains set in the same direction.

Obviously, the particular example described in the drawings is in accordance with the optical system and drive therein shown. The mechanism of course will vary in relation to the different reflections and intergearing of the parts, but whatever means is adopted, whether definite projection alone, reflection alone, or projection and reflection, or even direct viewing, preferably magnified, (which latter is an instance of light-transmission) the various gearings and arrangement of parts can be accommodated to the precise circumstances.

In the present specification the term "screen" has been used to indicate the final position in which the projection is seen, or from which it emerges, but it must distinctly be understood that such expression includes a structure in which an aerial image is observed.

As will be appreciated, the progress wheel, such as 35, which effects the drive for the progression of the slide, in all its positions where its axis is parallel to that of the roller 26 with which it contacts and which it drives, or where its axis is in any non-parallel position therewith, definitely does assure the drive thereof.

However, for primary setting purposes and when otherwise rendered necessary, means may be provided for lifting such progress wheel out of contact with the co-operating roller 26.

Thus, for a primary setting of the apparatus, the said progress wheel may be brought into any desired position. Again, for the setting of the slide in a defined position such non-contact of the progress wheel may be arranged although for some purposes in this last case such progress wheel might have a free-wheel device permitting the setting of the slide when the wheel is not driven.

For the hand setting of the slide, any of the spindles of the rollers 26 or 25 might have projecting therefrom a knurled head so that by this means, through suitable entry means into the casing of the apparatus, the slide definitely could be brought into any required position.

Already in the specification it has been suggested that the motor causing the progression of the slide can be automatically or otherwise controlled in accordance with the speed. Other variations to which the vehicle is liable also can be imposed upon the apparatus such as those necessitated by the direction and/or strength of the wind.

The invention is not limited to the precise forms or details of construction described, as these may be varied to suit particular cases.

What we claim and desire to secure by Letters Patent of the United States of America is:

1. An automatic course-indicating apparatus for vehicles, comprising a supporting frame, a carrier to take a representation of the total course, mounting means in the frame for said carrier by which it can have a movement within the frame in a single plane in two directions mutually at right angles, motor and driving means for effecting said movements proportionately to the movements of the vehicle, a viewing screen carried by the frame, a light-transmission and optical system within the frame the optical axis of which intersects the screen in a fixed point and the said representation of the total course in any position in use the latter can occupy, and means to turn the representation of the total course in its plane of movement about its point of intersection with the said optical axis by driven gyroscopic direction-control means carried by and subject to the movements of the vehicle.

2. An automatic course-indicating apparatus for vehicles provided with gyroscopic direction-control means carried by and subject to the movements of the vehicle, said course-indicating apparatus comprising a supporting frame, a carrier to take a transparent representation of the total course, mounting means in the frame for said carrier by which it can have a movement within the frame in a single plane in two directions mutually at right angles, motor and driving means for effecting said movements proportionately to the movements of the vehicle, a viewing screen carried by the frame, a light-transmission and optical system within the frame the optical axis of which intersects the screen in a fixed point and the said representation of the total course in any position in use the latter can occupy, and gear means to turn the representation of the total course in its plane of movement about its point of intersection with the said optical axis by said gyroscopic direction-control means.

3. An automatic course-indicating apparatus for vehicles provided with gyroscopic direction-control means carried by and subject to the movements of the vehicle, said course-indicating apparatus comprising a supporting frame, a carrier to take a representation of the total course, mounting means in the frame for said carrier by which it can have a movement within the frame in a single plane in two directions mutually at right angles, motor and driving means for effecting said movements proportionately to the movements of the vehicle, a viewing screen carried by the frame, a light-transmission and optical system within the frame the optical axis of which intersects the screen in a fixed point and the said representation of the total course in any position in use the latter can occupy, means to turn the representation of the total course in its plane of movement about its point of intersection with the said optical axis by said gyroscopic direction-control means, and gearing included in the motor and driving means subject to the said gyroscopic direction-control means.

4. An automatic course-indicating apparatus for vehicles, comprising a supporting frame, a carrier to take a transparent representation of the total course, mounting means in the frame for said carrier by which it can have a movement within the frame in a single plane in two directions mutually at right angles, motor and driving means for effecting said movements proportionately to the movements of the vehicle, a viewing screen carried by the frame, a light-transmission and optical system within the frame the optical axis of which intersects the screen in a fixed point and the said representation of the total course in any position in use the latter can occupy, gear means to turn the representation of the total course in its plane of movement about its point of intersection with the said optical axis by driven gyroscopic direction-control means carried by and subject to the movements of the vehicle, and a gearing included in the motor and driving means subject to the said driven gyroscopic direction-control means.

5. Automatic course-indicating apparatus for vehicles as claimed in claim 2 in which the optical system and gear means is such that the image of the portion of the slide being projected always moves across the screen in the same direction whatever the direction of movement of the vehicle.

6. An automatic course-indicating apparatus for vehicles, comprising a supporting frame, a carrier to take a transparent representation of the total course, mounting means in the frame for said carrier by which it can have a movement within the frame in a single plane in two directions mutually at right angles, motor and driving means for effecting said movements proportionately to the movements of the vehicle, a viewing screen carried by the frame, a light-transmission and optical system within the frame the optical axis of which intersects the screen in a fixed point and the said representation of the total course in any position in use the latter can occupy, gear means to turn the representation of the total course in its plane of movement about its point of intersection with the said optical axis by driven gyroscopic direction-control means carried by and subject to the movements of the vehicle, and a gearing including in the motor and driving means subject to the said driven gyroscopic direction-control means, said optical system and gear means being arranged in such manner that the image of the portion of the slide being projected always moves across the screen in the same direction whatever the direction of movement of the vehicle.

7. An automatic course-indicating apparatus for vehicles as claimed in claim 4 in which the carrier to take the representation of the total course comprises a turntable mounted on antifriction bearings in the frame of the apparatus having means for driving the said turntable from the driven gyroscopic direction-control means and carrying two guideways mutually at right angles to receive the actual representation of the total course.

8. An automatic course-indicating apparatus for vehicles as claimed in claim 4 in which the carrier to take the representation of the total course comprises a turntable mounted on antifriction bearings in the frame of the apparatus having means for driving the said turntable from the driven gyroscopic direction-control means and carrying two guideways mutually at right angles to receive the actual representation of the total course, and a motor carried by the turntable for imparting the movement of progression to the slide through suitable means driven thereby, said last named means including a driven wheel in operative association with the slide for effecting the movement thereof.

9. An automatic course-indicating apparatus for vehicles as claimed in claim 4 in which the carrier to take the representation of the total course comprises a turntable mounted on antifriction bearings in the frame of the apparatus having means for driving the said turntable from the driven gyroscopic direction-control means and carrying two guideways mutually at right angles to receive the actual representation of the total course, and a motor carried by the turntable for imparting the movement of progression to the slide through suitable means driven thereby, said last named means including a driven wheel in operative association with the slide for effecting the movement thereof, the axis of rotation of said driven wheel in all its positions remaining parallel to the slide, but under the gyroscopic control is adjustable to various angular settings.

JOHN GORDON HARGRAVE.
DENIS CEDRIC WILLIAMS.